United States Patent
Takahashi

(10) Patent No.: US 11,130,262 B2
(45) Date of Patent: Sep. 28, 2021

(54) RESIN SHEET PRODUCTION METHOD

(71) Applicant: Casio Computer Co., Ltd., Tokyo (JP)

(72) Inventor: Hideki Takahashi, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 182 days.

(21) Appl. No.: 16/436,808

(22) Filed: Jun. 10, 2019

(65) Prior Publication Data
US 2019/0381701 A1 Dec. 19, 2019

(30) Foreign Application Priority Data

Jun. 18, 2018 (JP) .............................. JP2018-115556

(51) Int. Cl.
*B29C 35/08* (2006.01)
*H01H 13/704* (2006.01)
(Continued)

(52) U.S. Cl.
CPC .. *B29C 35/0805* (2013.01); *B29C 2035/0822* (2013.01); *B29K 2101/12* (2013.01); *H01H 13/704* (2013.01); *H01H 13/88* (2013.01)

(58) Field of Classification Search
CPC ...... B41J 3/50; B41J 3/28; B32B 3/30; B32B 5/18; B32B 2451/00; B29K 2995/0012;
(Continued)

(56) References Cited

U.S. PATENT DOCUMENTS 5,728,332 A * 3/1998 Frisch .................... B05D 3/107
264/46.4
2017/0368721 A1* 12/2017 Saito ................... B29C 35/0805

FOREIGN PATENT DOCUMENTS

JP S6287826 U * 11/1985
JP 64/28660 A 1/1989
(Continued)

OTHER PUBLICATIONS

Japanese Office Action, dated Dec. 15, 2020, for Japanese Application No. 2018-115556, 6 pages. (with English machine translation).

*Primary Examiner* — Joseph S Del Sole
*Assistant Examiner* — Ariella Machness
(74) *Attorney, Agent, or Firm* — Seed IP Law Group LLP

(57) ABSTRACT

A resin sheet production method includes a preparation step of preparing a resin molding sheet including a base and a thermally expansive layer that is formed on one main surface of the base, the thermally expansive layer including a thermally expandable material; a heat conversion layer forming step of forming a heat conversion layer that converts electromagnetic waves to heat on at least one of the first main surface of the resin molding sheet or a second main surface on a side opposite to the first main surface; a pre-heating step of heating the resin molding sheet on which the heat conversion layer is formed to a temperature that is lower than an expansion starting temperature at which the thermally expandable material starts to expand; and a main heating step of irradiating the heat conversion layer of the resin molding sheet that is heated in the pre-heating step with the electromagnetic waves to cause the heat conversion layer to distend, thereby causing the base to deform and forming a shaped object on the resin molding sheet.

20 Claims, 12 Drawing Sheets

(51) Int. Cl.
*B29K 101/12* (2006.01)
*H01H 13/88* (2006.01)

(58) Field of Classification Search
CPC ....... B29K 2105/0076; B29K 2101/12; B41M 5/0052; B41M 5/0094; B41M 7/0045; B29C 35/0805; B29C 44/022; B29C 44/00; B29C 44/02; B29C 44/0407
See application file for complete search history.

(56) References Cited

FOREIGN PATENT DOCUMENTS

| | | | | |
|---|---|---|---|---|
| JP | 01028660 A | * | 1/1989 | |
| JP | 2-179789 A | | 7/1990 | |
| JP | 6/8254 A | | 1/1994 | |
| JP | 2001-150812 A | | 6/2001 | |
| JP | 2004299748 A | * | 10/2004 | |
| JP | 2013-67070 A | | 4/2013 | |
| JP | 2016-157476 A | | 9/2016 | |
| JP | 2017094706 A | * | 6/2017 | ................ B41J 2/01 |

* cited by examiner

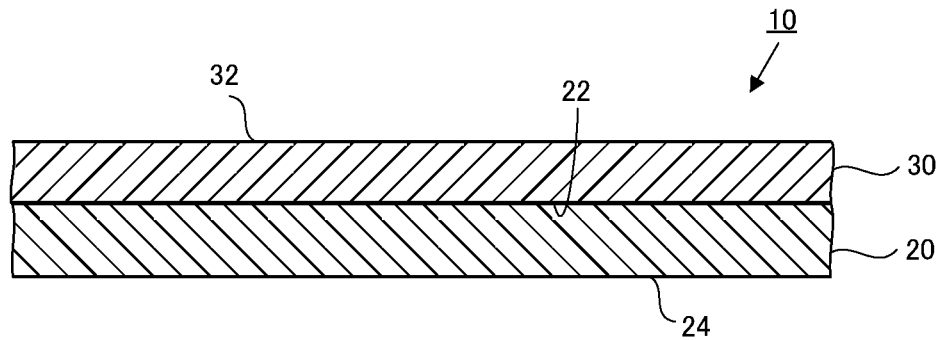
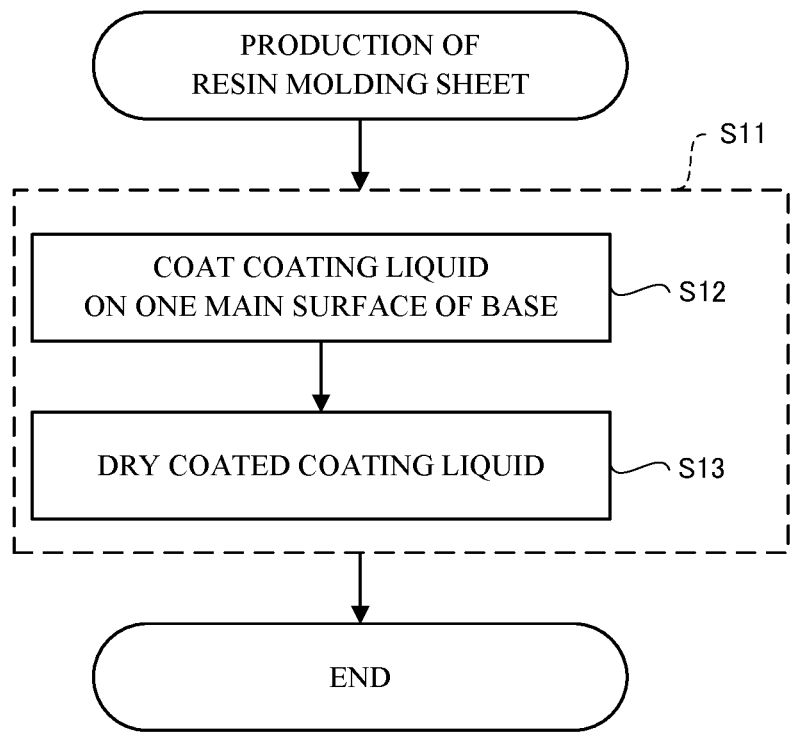

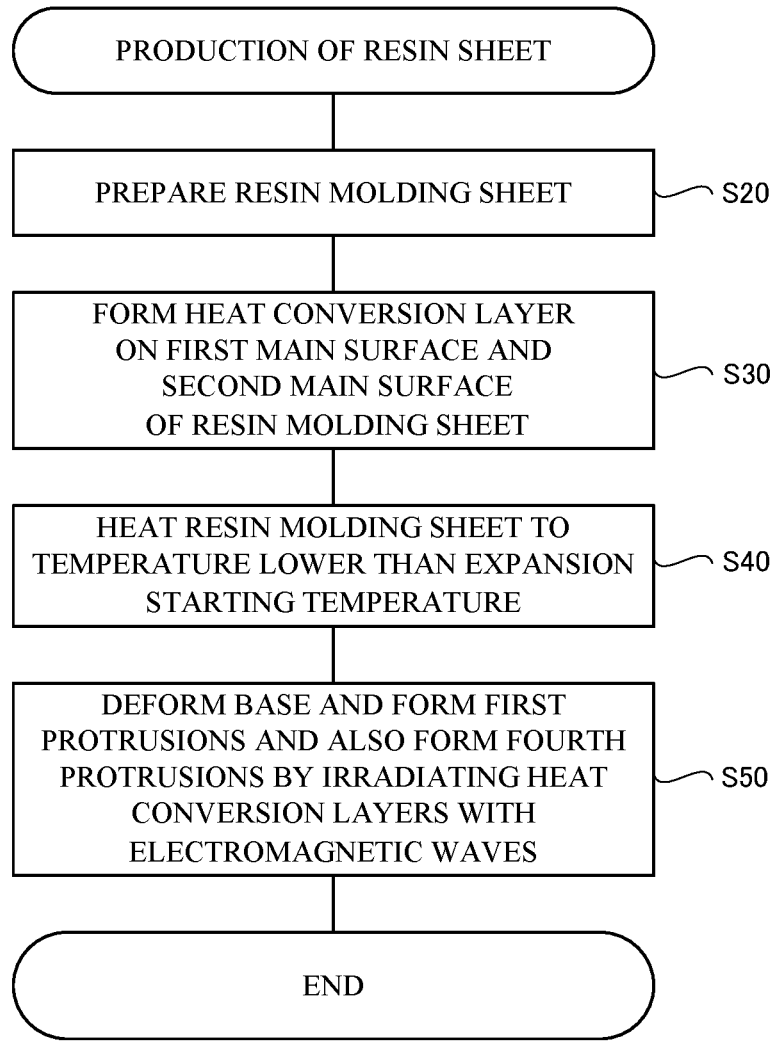
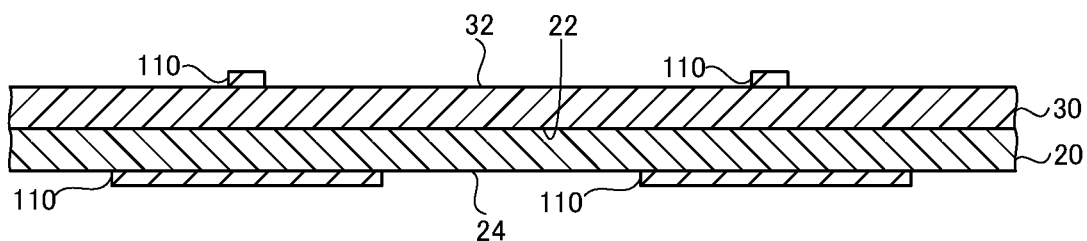

RESIN SHEET PRODUCTION METHOD

CROSS-REFERENCE TO RELATED APPLICATION

This application claims the benefit of Japanese Patent Application No. 2018-115556, filed on Jun. 18, 2018, the entire disclosure of which is incorporated by reference herein.

FIELD

The present disclosure relates generally to a resin sheet production method for a resin sheet that uses a thermally expandable material that distends due to heat.

BACKGROUND

In the related art, membrane switches that include surface sheets are used as input units of electronic devices. The surface sheet of the membrane switch is formed from resin, for example, and is subjected to embossing. In the embossing, various uneven patterns (that is, shaped objects) are formed in the resin sheet by pressing the resin sheet using a die (see, for example, Unexamined Japanese Patent Application Kokai Publication No. H06-8254).

In embossing processes that use dies, a die is needed that corresponds to the unevennesses to be formed in the resin sheet. This leads to problems of cost and time required to manufacture dies.

The present disclosure is made with the view of the above situation, and an objective of the present disclosure is to provide a resin sheet production method in which a resin sheet that includes shaped objects can be easily produced.

SUMMARY

An aspect of the present disclosure is a resin sheet production method that includes:
a preparation step of preparing a resin molding sheet including a base and a thermally expansive layer that is formed on one main surface of the base, the thermally expansive layer including a thermally expandable material;
a heat conversion layer forming step of forming a heat conversion layer that converts electromagnetic waves to heat on at least one of a first main surface of the resin molding sheet or a second main surface on a side opposite to the first main surface;
a pre-heating step of heating the resin molding sheet on which the heat conversion layer is formed to a temperature that is lower than an expansion starting temperature at which the thermally expandable material starts to expand; and
a main heating step of irradiating the heat conversion layer of the resin molding sheet that is heated in the pre-heating step with the electromagnetic waves to cause the heat conversion layer to distend, thereby causing the base to deform and forming a shaped object on the resin molding sheet.

Another aspect of the present disclosure is a resin sheet production method that includes:
a preparation step of preparing a resin molding sheet including a base and a thermally expansive layer that is formed on one main surface of the base, the thermally expansive layer including a thermally expandable material;
a heat conversion layer forming step of forming a heat conversion layer that converts electromagnetic waves to heat on at least one of a first main surface or a second main surface on a side opposite to the first main surface;
a first transportation step of (i) heating the resin molding sheet on which the heat conversion layer is formed to a temperature that is lower than an expansion starting temperature at which the thermally expandable material starts to expand, and (ii) transporting the resin molding sheet on which the heat conversion layer is formed; and
a second transportation step of (i) irradiating the heat conversion layer of the resin molding sheet that is heated in the pre-heating step with the electromagnetic waves to cause the heat conversion layer to distend, thereby causing the base to deform and forming a shaped object on the resin molding sheet, and (ii) transporting the resin molding sheet that is heated in the first transportation step.

According to the present disclosure, shaped objects can be formed by emitting electromagnetic waves, without using a die. As such, a resin sheet including shaped objects can be easily produced.

BRIEF DESCRIPTION OF THE DRAWINGS

A more complete understanding of this application can be obtained when the following detailed description is considered in conjunction with the following drawings, in which:

FIG. 1 is a schematic drawing illustrating a cross-section of a resin molding sheet according to Embodiment 1 of the present disclosure;

FIG. 2 is a flowchart illustrating a production method for the resin molding sheet according to Embodiment 1 of the present disclosure;

FIG. 19 is a flowchart illustrating a production method for the resin sheet according to Embodiment 4 of the present disclosure;

FIG. 20 is a schematic drawing illustrating a cross-section of the resin molding sheet according to Embodiment 4 of the present disclosure, on which a heat conversion layer is formed.

DETAILED DESCRIPTION

Figure 3:
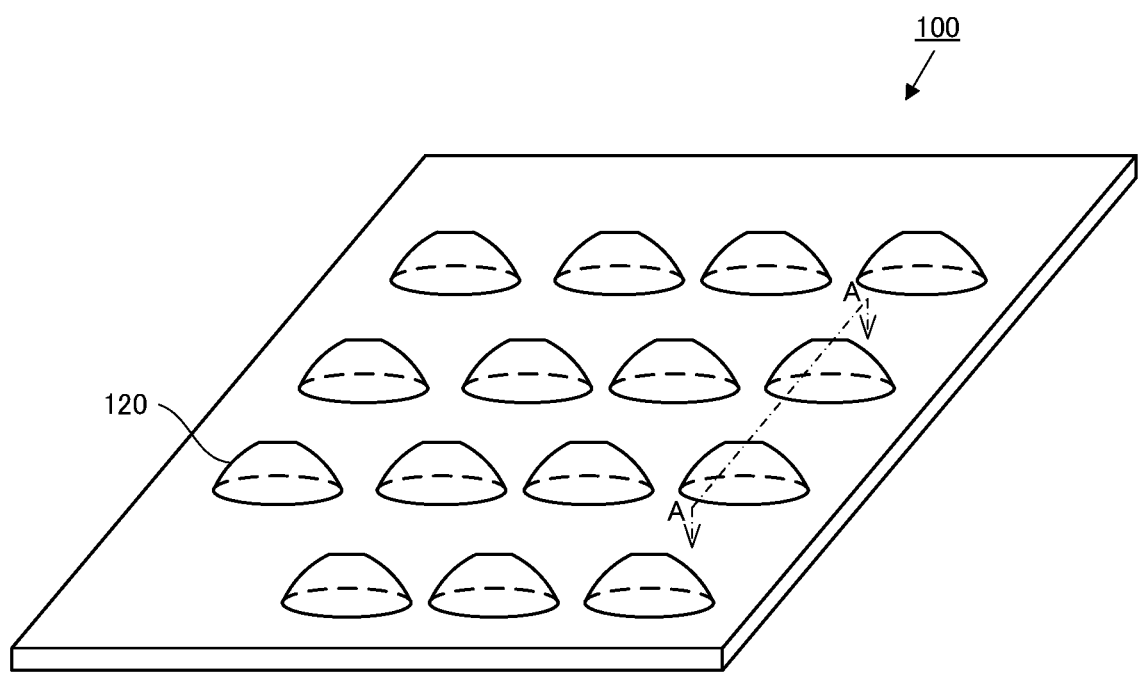
FIG. 3 is a schematic drawing of a resin sheet according to Embodiment 1 of the present disclosure.

Hereinafter, a resin sheet production method according to the present disclosure is described while referencing the drawings.

Embodiment 1

In the present embodiment, a resin sheet 100, which includes a first protrusion 120 as a shaped object, is produced from a resin molding sheet 10. The resin sheet 100 is used as Braille printed matter, a surface sheet of a membrane switch, and the like. In the present description, the term "shaped object" is not limited to objects that have a protruding shape such as the first protrusion 120, and includes objects that have recessed shapes, geometric shapes, and the like. Moreover, the shaped object may form characters, patterns, decorations, and the like. The term "decorations" refers to objects that appeal to the aesthetic sense through visual and/or tactile sensation. The term "shaped (or molded)" does not simply refer to the forming of a shaped object, but should be construed to also include concepts such as decorating and ornamenting.

The resin sheet 100 of the present embodiment is a three-dimensional object that includes the first protrusion 120 as a shaped object. However, to distinguish this three-dimensional object from three-dimensional objects formed using a so-called 3D printer, the resin sheet 100 of the present embodiment is called a 2.5-dimensional (2.5D) object of a pseudo-three-dimensional (pseudo-3D) object. Moreover, the technique used to produce the resin sheet 100 of the present embodiment is called 2.5D printing or pseudo-3D printing.

Resin Molding Sheet

First, the resin molding sheet 10 that is used in the production of the resin sheet 100 will be described while referencing FIGS. 1 and 2. As illustrated in FIG. 1, the resin molding sheet 10 includes a base 20 and a thermally expansive layer 30 formed on a first main surface 22 of the base 20.

The base 20 of the resin molding sheet 10 includes the first main surface 22, on which the thermally expansive layer 30 is formed, and a second main surface 24 on a side opposite to the first main surface 22. The base 20 supports the thermally expansive layer 30. In one example, the base 20 is formed in a sheet-like shape. Examples of the material of the base 20 include thermoplastic resins such as polyolefin resins (polyethylene (PE), polypropylene (PP), and the like) and polyester resins (polyethylene terephthalate (PET), polybutylene terephthalate (PBT), and the like).

The type of material of the base 20 and the thickness of the base 20 are set according to the ease of deformation of the base 20 that occurs during the production of the resin sheet 100, the strength of the deformed base 20, and the like. Additionally, the type of material of the base 20 and the thickness of the base 20 are selected according to the intended application of the resin sheet 100. For example, in a case in which the resin sheet 100 is to be used as a surface sheet of a membrane switch, the type of the material of the base 20 and the thickness of the base 20 are selected such that the resin sheet 100 will have elastic force that allows the resin sheet 100 to return to the original shape after having been pressed and deformed.

The thermally expansive layer 30 of the resin molding sheet 10 is provided on the main surface 22 of the base 20. The thermally expansive layer 30 is a layer that distends a magnitude according to the heating temperature, the heating time, and the like. The thermally expansive layer 30 includes a binder (not illustrated in the drawings) and a thermally expandable material (not illustrated in the drawings) dispersed in the binder. Any thermoplastic resin, such as a vinyl acetate polymer or an acrylic polymer, may be used as the binder of the thermally expansive layer 30. The thermally expandable material is a material that expands as a result of being heated to a predetermined temperature or higher. In one example, the thermally expandable material expands as a result of being heated to 80° C. to 120° C. or higher. In the following, the temperature at which the thermally expandable material starts to expand is referred to as the "the expansion starting temperature." In one example, the thermally expansive material is implemented as thermally expandable microcapsules.

The thermally expandable microcapsules are microcapsules that include shells made from a thermoplastic resin. A foaming agent made from propane, butane, or a similar low boiling point substance is encapsulated in the shells of the microcapsules. The shells of the thermally expandable microcapsules are formed from a thermoplastic resin such as, for example, polystyrene, polyvinyl chloride, polyvinylidene chloride, polyvinyl acetate, polyacrylic acid ester, polyacrylonitrile, polybutadiene, and copolymers thereof. When the thermally expandable microcapsules are heated to the thermal expansion start temperature or higher, the shells soften and the foaming agent vaporizes. The pressure resulting from the vaporization of the foaming agent causes the shells to expand in a balloon-like manner. The thermally expandable microcapsules expand to a size about five-times larger than that prior to expansion. In one example, the average particle size of the thermally expandable microcapsules is about 5 to 50 μm.

The binder and the thermally expandable microcapsules of the thermally expansive layer 30 and the thickness of the thermally expansive layer 30 are selected so as to allow the base 20 to deform to the desired shape during the production of the resin sheet 100. In the present embodiment, as described later, the height of a second protrusion 26 of the base 20, formed by the deformation of the base 20, is greater than the amount of change in the thickness of the thermally expansive layer 30 due to the expansion. As such, it is preferable that the thickness of the thermally expansive layer 30 is equal to or less than the thickness of the base 20.

In the present embodiment, the thermally expansive layer 30 is formed on the main surface 22 of the base 20.

Accordingly, one of the main surface 24 of the base 20 and a surface 32 of the thermally expansive layer 30 on the side opposite to the surface that contacts the main surface 22 of the base 20 becomes a first main surface of the resin molding sheet 10. The other of the surface 24 of the base 20 and the surface 32 of the thermally expansive layer 30 becomes a second main surface on the side opposite to the first main surface of the resin molding sheet 10. In the present embodiment, to facilitate comprehension, the surface 32 of the thermally expansive layer 30 is described as the first main surface 32 of the resin molding sheet 10. Additionally, the main surface 24 of the base 20 is described as the second main surface 24 of the resin molding sheet 10.

Next, a production method for the resin molding sheet 10 will be described. FIG. 2 is a flowchart illustrating the production method for the resin molding sheet 10. The production method for the resin molding sheet 10 includes a step of forming the thermally expansive layer 30 on the first main surface 22 of the base 20 (step S11).

First, the base 20 and a coating liquid for forming the thermally expansive layer 30 are prepared. The base 20 may be in a roll shape, or may be cut, in advance, into sheets. The coating liquid for forming the thermally expansive layer 30 is prepared by mixing the binder with the thermally expandable microcapsules.

In the step of forming the thermally expansive layer 30 (step S11), the coating liquid is coated on the first main surface 22 of the base 20 using a coating device (step S12). Examples of the coating device include bar coaters, roller coaters, and spray coaters. Next, the coating liquid that is coated on the first main surface 22 of the base 20 is dried (step S13). As a result, the thermal expansion layer 30 is formed on the first main surface 22 of the base 20. The resin molding sheet 10 is produced as described above. Note that the coating of the coating liquid (step S12) and the drying of the coating liquid (step S13) may be repeated in order to obtain a thermally expansive layer 30 having a predetermined thickness. Moreover, in cases in which the thermally expansive layer 30 is formed on a roll-shaped base 20, the base 20 on which the thermally expansive layer 30 is formed may be cut to a desired size.

Resin Sheet

Figure 4:
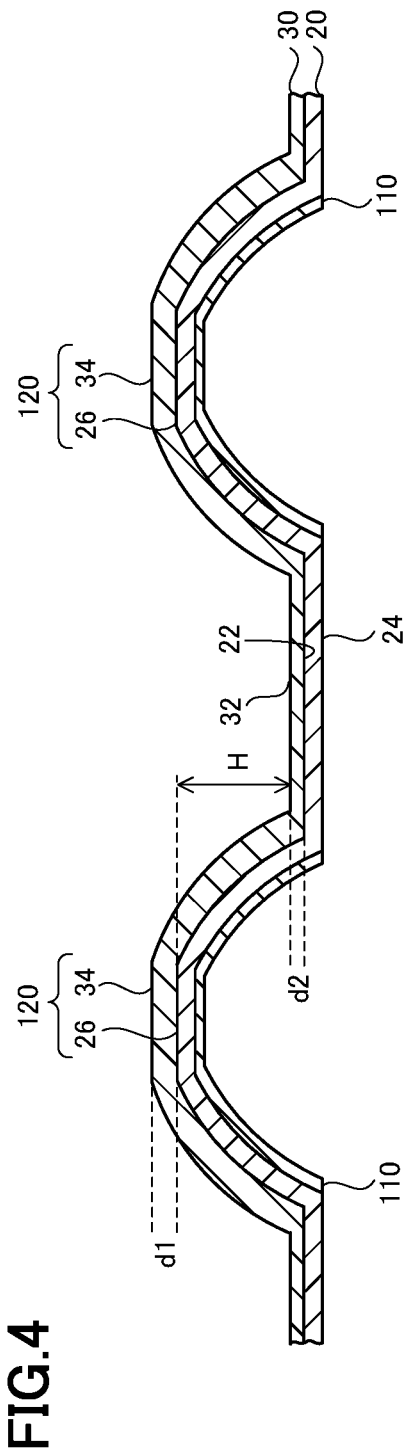
FIG. 4 is a cross-sectional view of the resin sheet depicted in FIG. 3, taken along line A-A.

Next, the resin sheet 100 that is produced from the resin molding sheet 10 will be described while referencing FIGS. 3 and 4. As illustrated in FIG. 3, the resin sheet 100 includes a plurality of first protrusions 120. As illustrated in FIG. 4, the resin sheet 100 includes the base 20, the thermally expansive layer 30 formed on the first main surface 22 of the base 20, and a heat conversion layer 110 formed in a predetermined pattern on the second main surface 24 of the base 20.

The resin sheet 100 includes the first protrusions 120 as shaped objects. The first protrusions 120 have a convex shape. The first protrusions 120 are formed corresponding to the predetermined pattern of the heat conversion layer 110. Each first protrusion 120 includes a second protrusion 26 formed on the base 20 and a third protrusion 34 formed on the thermally expansive layer 30.

The heat conversion layer 110 of the resin sheet 100 converts emitted electromagnetic waves to heat and releases the converted heat. The heat conversion layer 110 heats the base 20 and the thermally expansive layer 30 using the released heat. Specifically, the heat conversion layer 110 heats the base 20 to a temperature that is lower than the expansion starting temperature, thereby softening the base 20. Next, the heat conversion layer 110 heats the thermally expansive layer 30 to the expansion starting temperature or higher. The thermally expansive layer 30 distends a magnitude according to the heating temperature, the heating time, and the like. The heat conversion layer 110 converts electromagnetic waves to heat faster than the other portions of the resin sheet 100. As such, it is possible to selectively heat only the regions near the heat conversion layer 110. Accordingly, the portions of the resin molding sheet 10 that correspond to the pattern of the heat conversion layer 110 are selectively heated.

The heat conversion layer 110 is formed from a heat conversion material that absorbs and converts electromagnetic waves to heat. Examples of the heat conversion material include carbon black, metal hexaboride compounds, and tungsten oxide compounds. Carbon black, for example, absorbs and converts visible light, infrared light, and the like to heat. Metal hexaboride compounds and tungsten oxide compounds absorb and convert near-infrared light to heat. Among the metal hexaboride compounds and the tungsten oxide compounds, lanthanum hexaboride (LaB6) and cesium tungsten oxide are preferable from the perspectives of obtaining high light absorptivity in the near-infrared region and high transmittance in the visible light spectrum.

The configurations of the base 20 and the thermally expansive layer 30 of the resin sheet 100 are the same as the configurations of the base 20 and the thermally expansive layer 30 of the resin molding sheet 10. The second protrusions 26 of the base 20 and the third protrusions 34 of the thermally expansive layer 30, that is, the first protrusions 120 of the resin sheet 100, are formed in the production process of the resin sheet 100 by deforming the base 20. In the present embodiment, a height H of the second protrusion 26, which is formed by deforming the base 20, is greater than the difference between a thickness d1 of the thermally expansive layer 30 after distending and a thickness d2 of the thermally expansive layer 30 before distending. Note that the difference between the thickness d1 of the thermally expansive layer 30 after distending and the thickness d2 of the thermally expansive layer 30 before distending is defined as an amount of change ΔD, caused by the distending, of the thickness of the thermally expansive layer 30. In FIG. 4, the amount of change ΔD is the difference between the thickness d1 of the thermally expansive layer 30 at the third protrusion 34 and the thickness d2 of the thermally expansive layer 30 at portions other than the third protrusion 34.

Production Method for Resin Sheet

Next, the production method for the resin sheet 100 will be described. In the present embodiment, the resin sheet 100, which includes the first protrusions 120 as shaped objects, is produced from a sheet-like (for example, A4 paper size) resin molding sheet 10.

First, the devices used in the production method for the resin molding sheet 100 will be described. In a heat conversion layer forming step (step S30, described later), a printing device (not illustrated in the drawings) is used to print ink, which contains the heat conversion material, on the resin molding sheet 10. In one example, this printing device is an ink jet printer.

Figure 5:
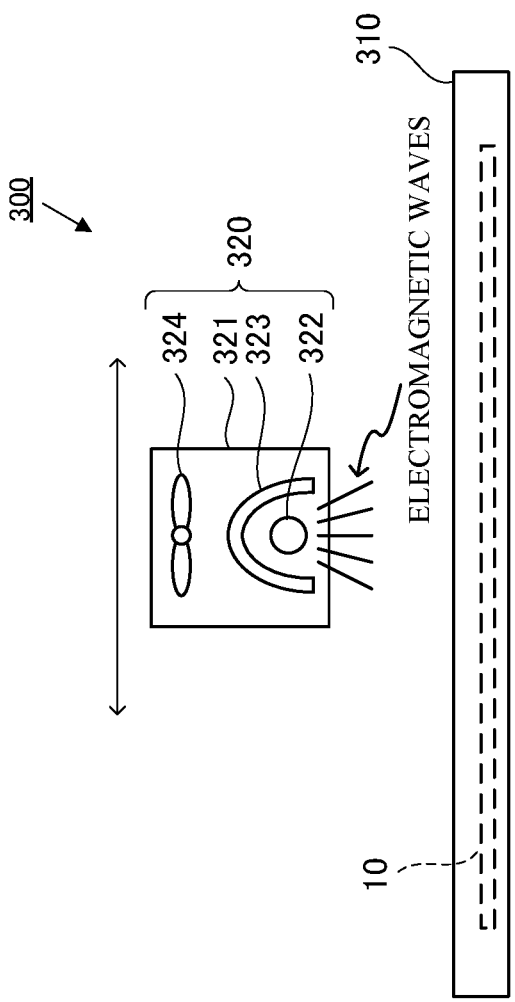
FIG. 5 is a schematic drawing illustrating an expansion device according to Embodiment 1 of the present disclosure.

An expansion device 300 is used in a pre-heating step (step S40, described later) and a main heating step (step S50, described later). As illustrated in FIG. 5, the expansion device 300 includes a tray 310 on which the resin molding sheet 10 is mounted, an irradiator 320 that irradiates the resin molding sheet 10 with electromagnetic waves, and a movement mechanism (not illustrated in the drawings) that moves the irradiator 320. In the following, the vertical direction in FIG. 5 is described as up and down.

The tray 310 of the expansion device 300 disposes the resin molding sheet 10 mounted thereon at a predetermined position in the expansion device 300.

The irradiator 320 of the expansion device 300 irradiates the resin molding sheet 10 that is mounted on the tray 310 with electromagnetic waves. The moving mechanism moves the irradiator 320 above the resin molding sheet 10 by the moving mechanism while the irradiator 320 irradiates the resin molding sheet 10 with electromagnetic waves. The irradiator 320 includes a cover 321, a lamp heater 322, a reflection plate 323, and a fan 324.

The cover 321 of the irradiator 320 accommodates the lamp heater 322, the reflection plate 323, and the fan 324. In one example, the lamp heater 322 of the irradiator 320 is constituted from a straight tubular halogen lamp. The lamp heater 322 irradiates the resin molding sheet 10 with electromagnetic waves in the near-infrared region (750 nm to 1400 nm wavelength range), the visible light spectrum (380 nm to 750 nm wavelength range), the intermediate infrared region (1400 nm to 4000 nm wavelength range), or the like. The reflection plate 323 reflects the electromagnetic waves, emitted from the lamp heater 322, toward the resin molding sheet 10. The fan 324 sends air into the cover 321, thereby cooling the lamp heater 322 and the reflection plate 323.

Figure 6:
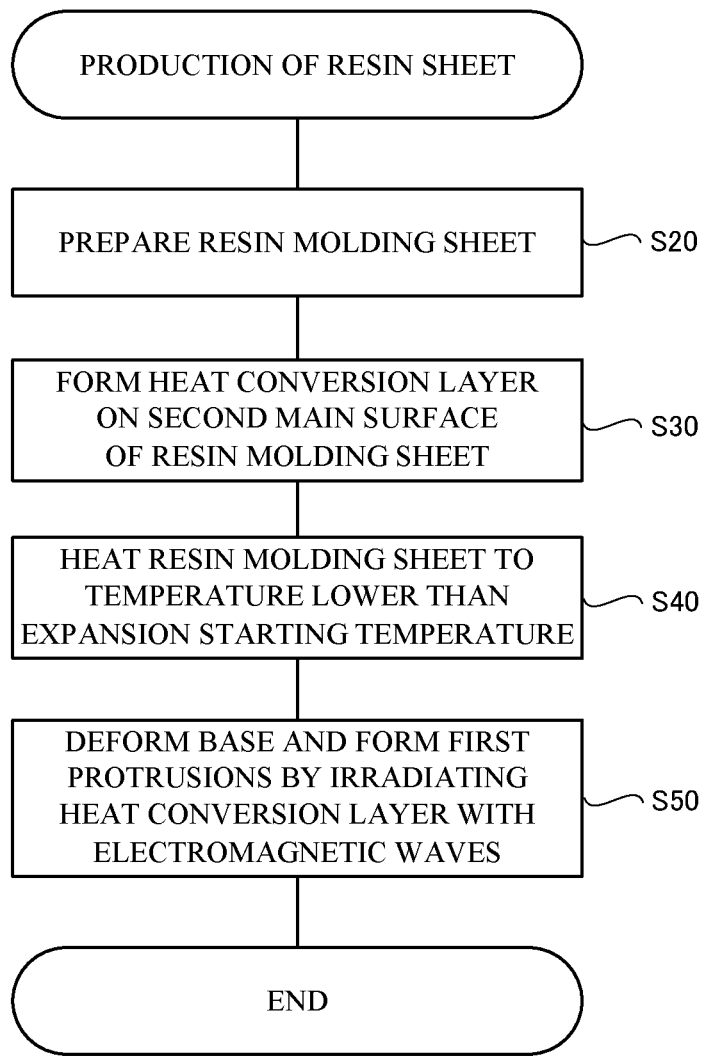
FIG. 6 is a flowchart illustrating a production method for the resin sheet according to Embodiment 1 of the present disclosure.
Figure 7:
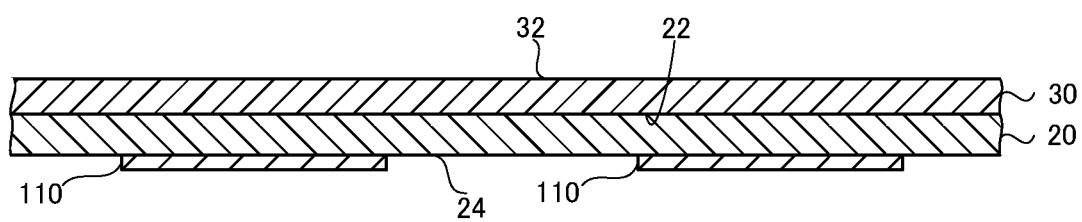
FIG. 7 is a schematic drawing illustrating a cross-section of the resin molding sheet according to Embodiment 1 of the present disclosure, on which a heat conversion layer is formed.

Next, the production method for the resin sheet 100 will be described while referencing FIGS. 6 and 7. FIG. 6 is a flowchart illustrating the production method for the resin sheet 100. The production method for the resin sheet 100 includes a preparation step of preparing the resin molding sheet 10 (step S20), a heat conversion layer forming step of forming the heat conversion layer 110 (step S30), a pre-heating step of heating the resin molding sheet 10 to a temperature that is lower than the expansion starting temperature of the thermally expandable material (step S40), and a main heating step of forming the first protrusions 120 by emitting electromagnetic waves and causing the thermally expansive layer 30 to distend (step S50).

In the preparation step (step S20), first the resin molding sheet 10 is prepared. In one example, the resin molding sheet 10 is produced via the production method for the resin molding sheet 10 described above (step S11 to step S13). Furthermore, the ink that contains the heat conversion material is prepared. The ink that contains the heat conversion material is carbon black-containing ink, for example.

Next, in the heat conversion layer forming step (step S30), the carbon black-containing ink is printed, in a predetermined pattern that corresponds to the pattern of the first protrusions 120, on the second main surface 24 of the base 20 (that is, on the second main surface 24 of the resin molding sheet 10) by the printing device. As a result, as illustrated in FIG. 7, the heat conversion layer 110 is formed on the second main surface 24 of the resin molding sheet 10. Here, the amount of the heat released from the heat conversion layer 110 depends on the density of the carbon black and the amount of energy per unit area and per unit time of the electromagnetic waves emitted on the heat conversion layer 110. As such, it is possible to control the amount of change ΔD in the thickness of the thermally expansive layer 30 and the height H of the second protrusion 26 of the base 20 by adjusting the density of the carbon black-containing ink and the energy per unit area and per unit time of the emitted electromagnetic waves. Furthermore, it is possible to control the height of the first protrusions 120 of the resin sheet 100 by controlling the amount of change ΔD in the thickness of the thermally expansive layer 30 and the height H of the second protrusion 26 of the base 20. The amount of energy per unit area and per unit time of the electromagnetic waves emitted on the heat conversion layer 110 will be discussed later.

In FIG. 6, in the pre-heating step (step S40), the resin molding sheet 10 on which the heat conversion layer 110 is formed (hereinafter referred to as "resin molding sheet with heat conversion layer 10") is set on the tray 310 of the expansion device 300. Then, the resin molding sheet with heat conversion layer 10 is irradiated with electromagnetic waves from the irradiator 320 of the expansion device 300 and, as a result, the resin molding sheet with heat conversion layer 10 is heated to a temperature that is lower than the expansion starting temperature.

Specifically, as a first movement of the irradiator 320, the irradiator 320 is moved while irradiating the resin molding sheet with heat conversion layer 10 with electromagnetic waves. The temperature of the resin molding sheet with heat conversion layer 10 can be adjusted by controlling the movement speed of the irradiator 320, the intensity of the electromagnetic waves, and the like, thereby controlling the amount of energy per unit area and per unit time of the electromagnetic waves emitted on the resin molding sheet with heat conversion layer 10.

In the present embodiment, the resin molding sheet with heat conversion layer 10 is heated to a temperature that is lower than the expansion starting temperature and, as a result, the base 20 softens. Accordingly, in the main heating step (step S50), the first protrusions 120 of the resin sheet 100 can be formed with a greater height. Furthermore, due to the softening of the base 20, finer first protrusions 120 can be formed.

If the resin molding sheet with heat conversion layer 10 is heated to the expansion starting temperature or higher, the thermally expansive layer 30 will distend before the main heating step (step S50). Therefore, the resin molding sheet with heat conversion layer 10 is heated to a temperature that is lower than the expansion starting temperature. In the main heating step (step S50), in order to prevent regions of the thermally expansive layer 30 that are distant from the heat conversion layer 110 from distending, it is preferable that the resin molding sheet with heat conversion layer 10 is heated to no higher than a temperature that is 5° C. lower than the expansion starting temperature. In order to sufficiently soften the base 20, it is preferable that the resin molding sheet with heat conversion layer 10 is heated to a temperature that is equal to or higher than a temperature that is 25° C. lower than the Vicat softening temperature of the material of the base 20. Furthermore, it is preferable that the temperature of the region of the base 20 where the heat conversion layer 110 is provided is higher than the temperature of the regions where the heat conversion layer 110 is not provided. As a result of this configuration, the softening of the region of the base 20 where the heat conversion layer 110 is not provided can be controlled, and even finer first protrusions 120 can be formed in the main heating step (step S50). Note that, the Vicat softening temperature is measured according to JIS K 7206 (B50 method), for example. In general, the Vicat softening temperature of polyethylene is from 70° C. to 80° C., and the Vicat softening temperature of polybutylene terephthalate is from 180° C. to 190° C.

Finally, in the main heating step (step S50), the heat conversion layer 110 of the resin molding sheet with heat conversion layer 10, which is heated to a temperature that is lower than the expansion starting temperature in the pre-heating step (step S40), is irradiated with electromagnetic waves from the irradiator 320, thereby causing the thermally expansive layer 30 to distend. As a result, the base 20 is deformed and the first protrusions 120 are formed on the resin molding sheet with heat conversion layer 10. That is, in the present embodiment, the heating is divided into two steps, namely the pre-heating step (step S40) and the main heating step (step S50).

Specifically, as a second movement of the irradiator 320, the irradiator 320 is moved while irradiating the heat conversion layer 110 with electromagnetic waves. Here, the amount of energy per unit area and per unit time of the electromagnetic waves emitted on the heat conversion layer 110 are controlled so that the thermally expansive layer 30 is heated to the expansion starting temperature or higher by the heat released from the heat conversion layer 110. As a result, the portions of the thermally expansive layer 30 that correspond to the pattern of the heat conversion layer 110 selectively distend. The amount of energy per unit area and per unit time of the electromagnetic waves emitted on the thermally expansive layer 30 can be controlled by the movement speed of the irradiator 320, the intensity of the electromagnetic waves emitted from the irradiator 320, and the like.

When the thermally expansive layer 30 formed on the main surface 22 of the base 20 distends, the base 20 is subjected to force perpendicular to the main surface 22 and the main surface 24. This force acts from the main surface 24 toward the main surface 22. Since the base 20 is softened in the pre-heating step (step S40) and is further softened by the heat released from the heat conversion layer 110, the base 20 deforms toward the thermally expansive layer 30 side due to the perpendicular force that results from the distending of the thermally expansive layer 30. Due to the deformation of the base 20, the second protrusion 26 is formed on the base 20, and the third protrusion 34 is formed on the thermally expansive layer 30. Moreover, the first protrusions 120 are formed on the resin molding sheet with heat conversion layer 10. As described above, the height of the first protrusions 120 can be controlled by the density of the carbon black-containing ink that forms of the heat conversion layer 110 and the amount of energy per unit area and per unit time of the electromagnetic waves emitted at the heat conversion layer 110.

In the present embodiment, in the pre-heating step (step S40), the base 20 is softened and, as such, the height of the first protrusions 120 of the resin sheet 100 can be increased. Furthermore, finer first protrusions 120 can be formed.

Thus, the resin sheet 100, which includes the first protrusions 120 as shaped objects, can be produced. In the present embodiment, the first protrusions 120 are formed by emitting electromagnetic waves, without using a die. As such, the resin sheet 100 can be easily produced. Furthermore, before forming the first protrusions 120 by distending the thermally expansive layer 30, the resin molding sheet with heat conversion layer 10 is heated, by irradiating with electromagnetic waves, to a temperature that is lower than the expansion starting temperature, thereby softening the base 20. As such, the first protrusions 120 can be formed with a greater height. Furthermore, finer first protrusions 120 can be formed.

Embodiment 2

In the production of the resin sheet 100 according to Embodiment 1, the thermally expansive layer 30 and the heat conversion layer 110 are formed on the base 20, but other layers may also be formed when producing the resin sheet 100.

Figure 8:
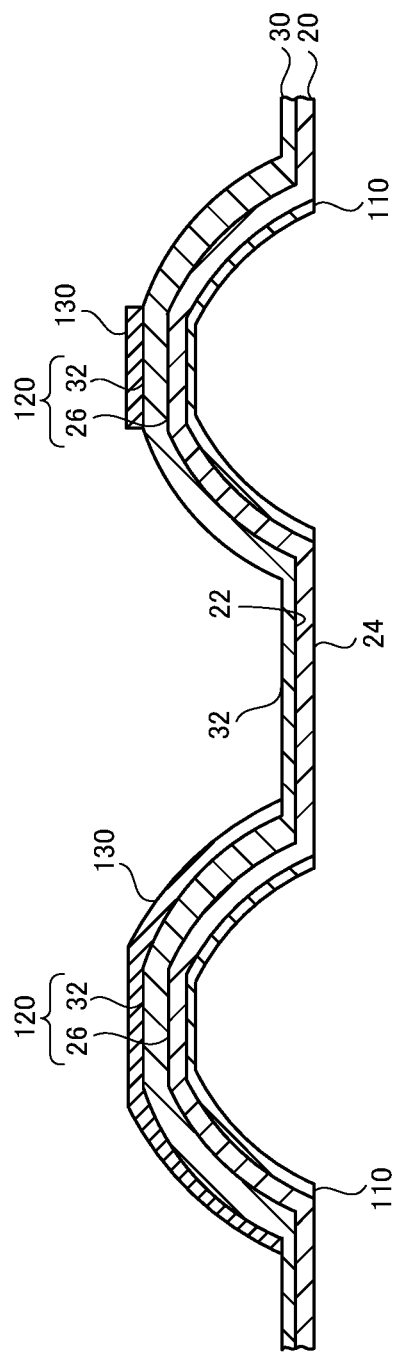
FIG. 8 is a schematic drawing illustrating a cross-section of a resin sheet according to Embodiment 2 of the present disclosure.

As illustrated in FIG. 8, in the present embodiment, the resin sheet 100 includes the base 20, the thermally expansive layer 30, the heat conversion layer 110, and a color ink layer 130. The resin sheet 100 includes the first protrusions 120 as shaped objects. The configurations of the base 20, the thermally expansive layer 30, and the heat conversion layer 110 are the same as the base 20, the thermally expansive layer 30, and the heat conversion layer 110 of Embodiment 1. Here, the color ink layer 130 and a production method for a resin sheet 100 that includes the color ink layer 130 will be described. As in Embodiment 1, the surface 32 of the thermally expansive layer 30 is the first main surface 32 of the resin molding sheet 10. Additionally, the main surface 24 of the base 20 is the second main surface 24 of the resin molding sheet 10.

First, a description of the color ink layer 130 will be given. The color ink layer 130 is provided on the surface 32 of the thermally expansive layer 30. Color images of characters, shapes, patterns, and the like can be formed on the resin sheet 100 by providing the color ink layer 130 in predetermined patterns.

The color ink layer 130 is formed from inks of four colors, namely cyan (C), magenta (M), yellow (Y), and black (K). It is preferable that the black (K) ink is free of carbon so as not to convert electromagnetic waves to heat and release the converted heat.

Figure 9:
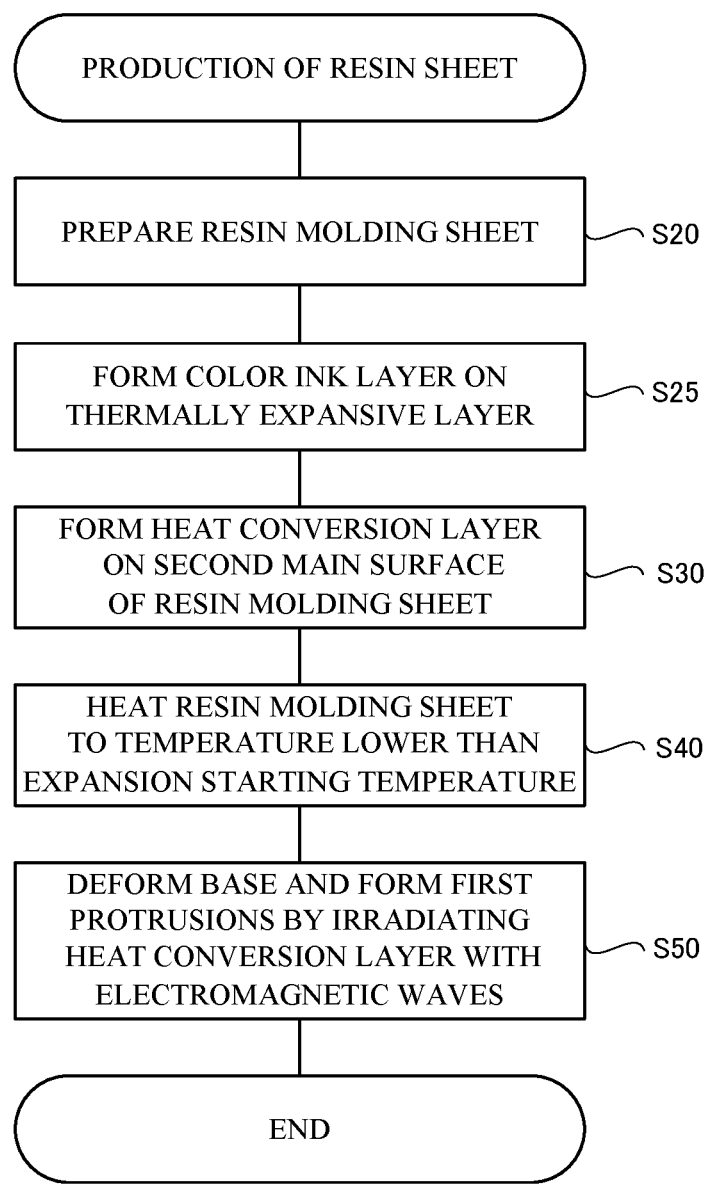
FIG. 9 is a flowchart illustrating a production method for the resin sheet according to Embodiment 2 of the present disclosure.
Figure 10:
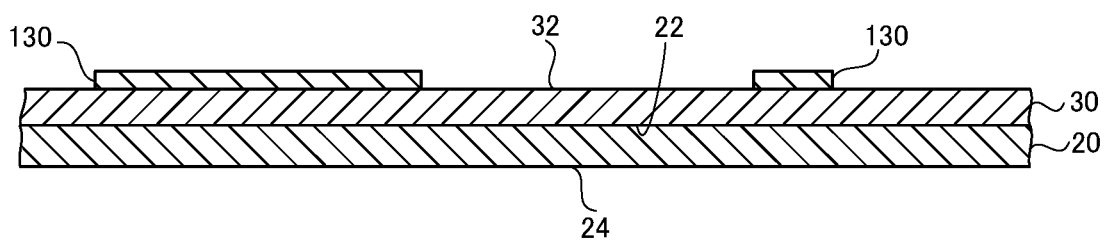
FIG. 10 is a schematic drawing illustrating a cross-section of the resin molding sheet according to Embodiment 2 of the present disclosure, on which a color ink layer is formed.
Figure 11:
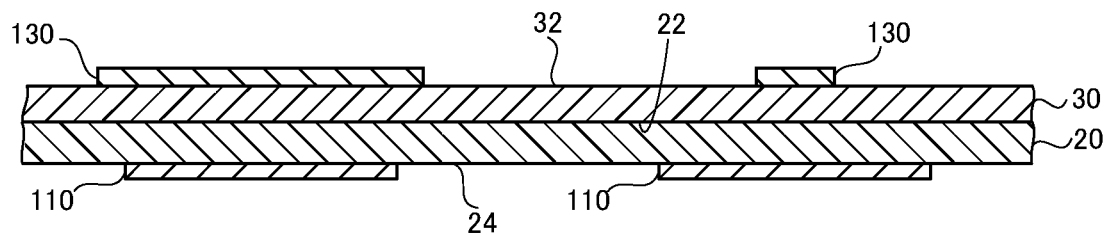
FIG. 11 is a schematic drawing illustrating a cross-section of the resin molding sheet according to Embodiment 2 of the present disclosure, on which a heat conversion layer is formed.

Next, a production method for the resin sheet 100 that includes the color ink layer 130 of the present embodiment will be described while referencing FIGS. 9 to 11. FIG. 9 is a flowchart illustrating the production method for the resin sheet 100 of the present embodiment. The production method for the resin sheet 100 of the present embodiment includes a preparation step (step S20), a color ink layer forming step of forming the color ink layer 130 (step S25), a heat conversion layer forming step (step S30), a pre-heating step (step S40), and a main heating step (step S50).

In the preparation step (step S20), the resin molding sheet 10 is prepared in the same manner as in the production method for the resin sheet 100 according to Embodiment 1. Furthermore, ink that contains the heat conversion material and inks of four colors, namely CMYK, are prepared.

Next, in the color ink layer forming step (step S25), the inks of four colors, namely CMYK, are printed on the thermally expansive layer 30 in a predetermined pattern by the printing device. As a result, as illustrated in FIG. 10, the color ink layer 130 is formed, in the predetermined pattern, on the surface 32 of the resin molding sheet 10 (that is, on the first main surface 32 of the resin molding sheet 10).

Next, in FIG. 9, in the heat conversion layer forming step (step S30), the ink that contains the heat conversion material is printed, in a predetermined pattern, on the second main surface 24 of the base 20 of the resin molding sheet 10 (that is, on the second main surface 24 of the resin molding sheet 10) on which the color ink layer 130 is formed. As a result, as illustrated in FIG. 11, the heat conversion layer 110 is formed on the second main surface 24 of the resin molding sheet 10. With the exception of the color ink layer 130 being formed, the heat conversion layer forming step (step S30) of the present embodiment is the same as the heat conversion layer forming step (step S30) of Embodiment 1.

Next, the pre-heating step (step S40) and the main heating step (step S50) of FIG. 9 are performed. With the exception of the color ink layer 130 being formed, the pre-heating step (step S40) and the main heating step (step S50) of the present embodiment are the same as the pre-heating step (step S40) and the main heating step (step S50) of Embodiment 1.

Thus, the resin sheet 100, which includes the first protrusions 120 as shaped objects, and also includes the color ink layer 130, can be produced. As in Embodiment 1, in the present embodiment, the first protrusions 120 are formed by emitting electromagnetic waves, without using a die. As such, the resin sheet 100 can be easily produced. Furthermore, before forming the first protrusions 120 by causing the thermally expansive layer 30 to distend, the base 20 is softened and, as such, the first protrusions 120 can be formed with a greater height. Furthermore, finer first protrusions 120 can be formed. Note that a configuration is possible in which the color ink layer forming step (step S25) is performed after the heat conversion layer forming step (step S30) of Embodiment 1.

Embodiment 3

The resin sheets 100 of Embodiments 1 and 2 include the heat conversion layer 110 on the second main surface 24 of the base 20, but the heat conversion layer 110 may be removed.

Figure 12:
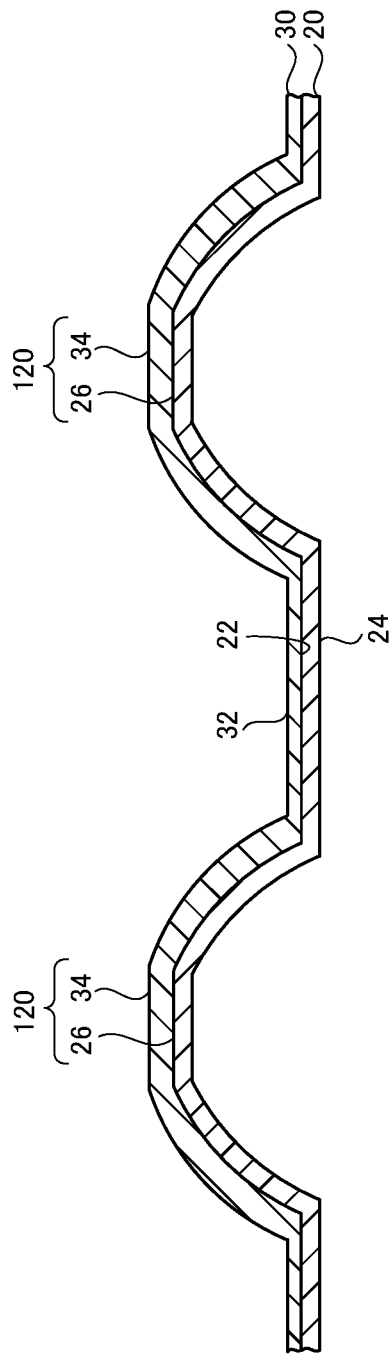
FIG. 12 is a schematic drawing illustrating a cross-section of a resin sheet according to Embodiment 3 of the present disclosure.

As illustrated in FIG. 12, the resin sheet 100 of the present embodiment includes the base 20 and the thermally expansive layer 30. The resin sheet 100 of the present embodiment does not include the heat conversion layer 110. In addition, the resin sheet 100 includes the first protrusions 120 as shaped objects. The configurations of the base 20 and the thermally expansive layer 30 are the same as the configurations of the base 20 and the thermally expansive layer 30 of Embodiment 1. Here, the resin molding sheet 10 used in the production of the resin sheet 100 of the present embodiment and a production method for the resin sheet 100 of the present embodiment will be described.

Figure 13:
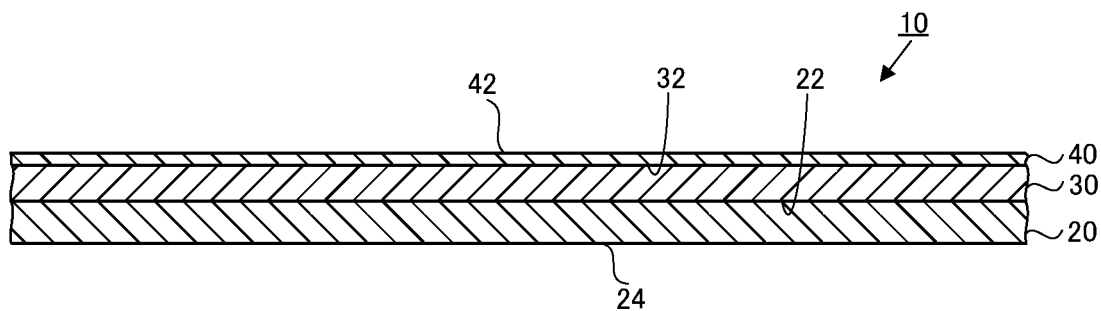
FIG. 13 is a schematic drawing illustrating a cross-section of a resin molding sheet according to Embodiment 3 of the present disclosure.

As illustrated in FIG. 13, the resin molding sheet 10 of the present embodiment includes the base 20, the thermally expansive layer 30, and a release layer 40. Since the base 20 and the thermally expansive layer 30 are the same as the base 20 and the thermally expansive layer 30 of Embodiment 1, the following description will focus on the release layer 40.

The release layer 40 of the resin molding sheet 10 is provided on the surface 32 of the thermally expansive layer 30. The release layer 40 is peelably provided on the surface 32 of the thermally expansive layer 30. In one example, the release layer 40 is formed from a commercially available release film. Release films are resin films that are formed from PET, PE, or the like. The surface of the release film to be released is subjected to a releasing treatment (for example, silicon coating treatment). In the resin molding sheet 10 of the present embodiment, a surface 42 of the release layer 40, on a side opposite to the surface contacting the thermally expansive layer 30, is the first main surface 42 of the resin molding sheet 10. Additionally, the main surface 24 of the base 20 is the second main surface 24 of the resin molding sheet 10.

Figure 14:
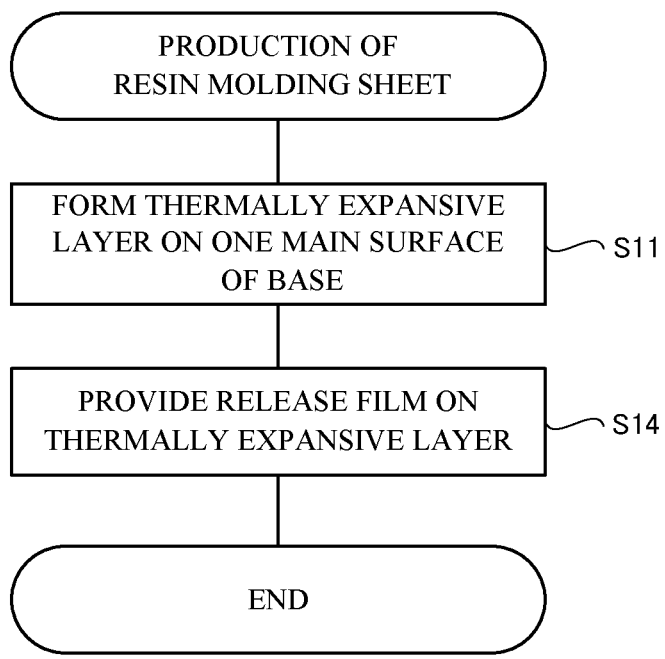
FIG. 14 is a flowchart illustrating a production method for the resin molding sheet according to Embodiment 3 of the present disclosure.

Next, a production method for the resin molding sheet 10 according to the present embodiment will be described while referencing FIG. 14. The production method for the resin molding sheet 10 according to the present embodiment includes a step of forming the thermally expansive layer 30 on the first main surface 22 of the base 20 (step S11), and a step of providing the release layer 40 on the thermally expansive layer 30 (step S14).

First, the base 20, the coating liquid for forming the thermally expansive layer 30, and the release film are prepared. The coating liquid for forming the thermally expansive layer 30 is the same as the coating liquid used in the production method for the resin molding sheet 10 of Embodiment 1. The release film is a resin film that is formed from PET, for example, and that is subjected to a releasing treatment.

In the step of forming the thermally expansive layer 30 (step S11), the thermally expansive layer 30 is formed on the first main surface 22 of the base 20, the same as in the step of forming the thermally expansive layer 30 (step S11) of Embodiment 1. In the step of providing the release layer 40 on the thermally expansive layer 30 (step S14), the release layer 40 is provided on the thermally expansive layer 30 by affixing the release film to the surface 32 of the thermally expansive layer 30. Thus, the resin molding sheet 10 of the present embodiment can be produced.

Figure 15:
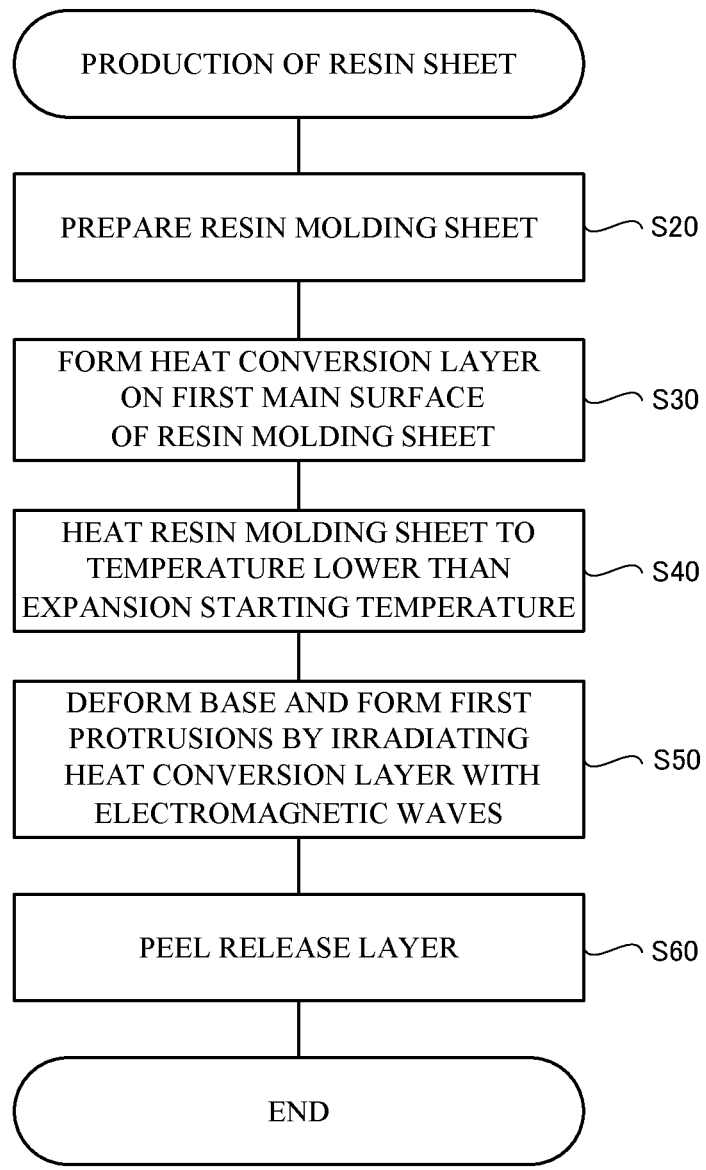
FIG. 15 is a flowchart illustrating a production method for the resin sheet according to Embodiment 3 of the present disclosure.
Figure 16:
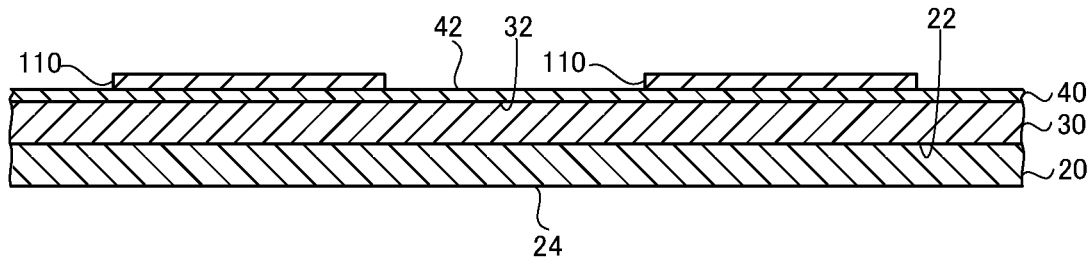
FIG. 16 is a schematic drawing illustrating a cross-section of the resin molding sheet according to Embodiment 3 of the present disclosure, on which a heat conversion layer is formed.
Figure 17:
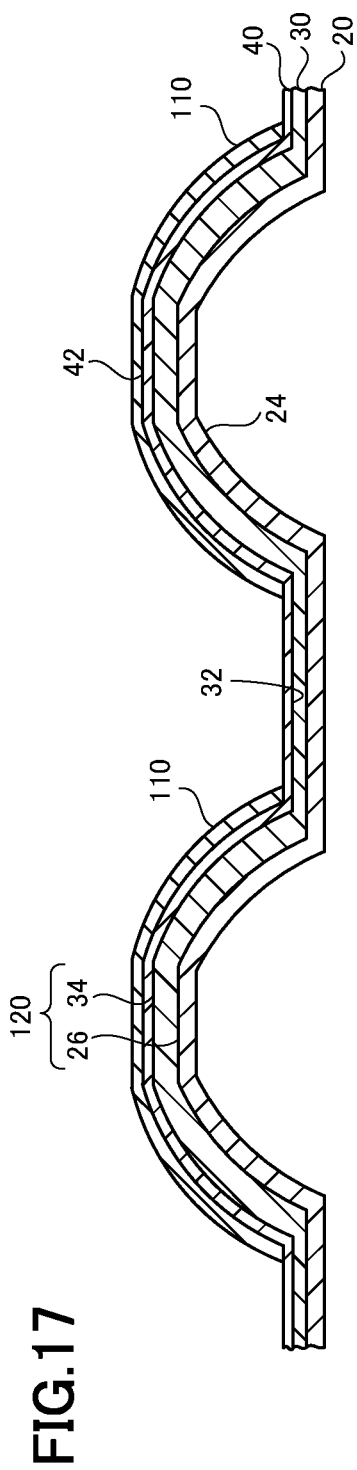
FIG. 17 is a schematic drawing illustrating a cross-section of the resin molding sheet according to Embodiment 3 of the present disclosure, on which a first protrusion is formed.

Finally, a production method for the resin sheet 100 of the present embodiment will be described while referencing FIGS. 15 to 17. FIG. 15 is a flowchart illustrating the production method for the resin sheet 100 of the present embodiment. The production method for the resin sheet 100 of the present embodiment includes a preparation step of preparing the resin molding sheet 10 (step S20), a heat conversion layer forming step of forming the heat conversion layer 110 (step S30), a pre-heating step (step S40), a main heating step (step S50), and a peeling step of peeling the release layer 40 (step S60).

First, the resin molding sheet 10 on which the release layer 40 is provided is prepared (step S20). In one example, the resin molding sheet 10 on which the release layer 40 is provided is produced via the production method of the present embodiment described above (step S11 and step S14). Furthermore, ink that contains the heat conversion material is prepared.

Next, in the heat conversion layer forming step (step S30), the ink that contains the heat conversion material is printed, in a predetermined pattern, on the surface 42 of the release layer 40 (that is, on the first main surface 42 of the resin molding sheet 10) by the printing device. As a result, as illustrated in FIG. 16, the heat conversion layer 110 is formed, in the predetermined pattern, on the first main surface 42 of the resin molding sheet 10. With the exception of the thermally expansive layer 30 being formed on the first main surface 42 of the resin molding sheet 10, the heat conversion layer forming step (step S30) of the present embodiment is the same as the heat conversion layer forming step (step S30) of Embodiment 1.

Next, the pre-heating step (step S40) of FIG. 15 is performed. With the exception of the thermally expansive layer 30 being formed on the first main surface 42 of the resin molding sheet 10, the pre-heating step (step S40) of the present embodiment is the same as the pre-heating step (step S40) of Embodiment 1.

In the main heating step (step S50), the heat conversion layer 110 of the resin molding sheet with heat conversion layer 10 that is heated to a temperature that is lower than the expansion starting temperature in the pre-heating step (step S40) is irradiated with electromagnetic waves from the irradiator 320. As a result, as illustrated in FIG. 17, the first protrusions 120 are formed on the resin molding sheet with heat conversion layer 10. With the exception of the thermally expansive layer 30 being formed on the first main surface 42 of the resin molding sheet 10, the main heating step (step S50) of the present embodiment is the same as the main heating step (step S50) of Embodiment 1.

Finally, in the peeling step (step S60), the release layer 40 is peeled from the resin molding sheet 10. As a result, the heat conversion layer 110 that is formed on the surface 42 of the release layer 40 is removed together with the release layer 40.

Thus, a resin sheet 100, which does not include the heat conversion layer 110, can be produced. In the present embodiment, the heat conversion layer 110 can be removed by simply peeling the release layer 40. As such, a resin sheet 100 that does not include the heat conversion layer 110 can easily be produced. In the present embodiment, the first protrusions 120 are formed by emitting electromagnetic waves, without using a die. As such, a resin sheet 100 that does not include the heat conversion layer 110 can be easily produced. Furthermore, in the pre-heating step (step S40), the base 20 is softened and, as such, the height of the first protrusions 120 can be increased. Additionally, finer first protrusions 120 can be formed. The resin sheet 100 of the present embodiment does not include the heat conversion layer 110 and, as such, the production method of the present embodiment can provide a cleaner resin sheet 100 in which the pattern of the heat conversion layer 110 is not recognizable by a user.

Embodiment 4

In the production of the resin sheets 100 of Embodiments 1 and 2, the heat conversion layer 110 is formed on the second main surface 24 of the resin molding sheet 10. In the production of the resin sheet 100 of Embodiment 3, the thermally expansive layer 110 is formed on the first main surface 42 of the resin molding sheet 10. A configuration is possible in which the heat conversion layer 110 is formed on the first main surface 32 and the second main surface 24 of the resin molding sheet 10.

Figure 18:
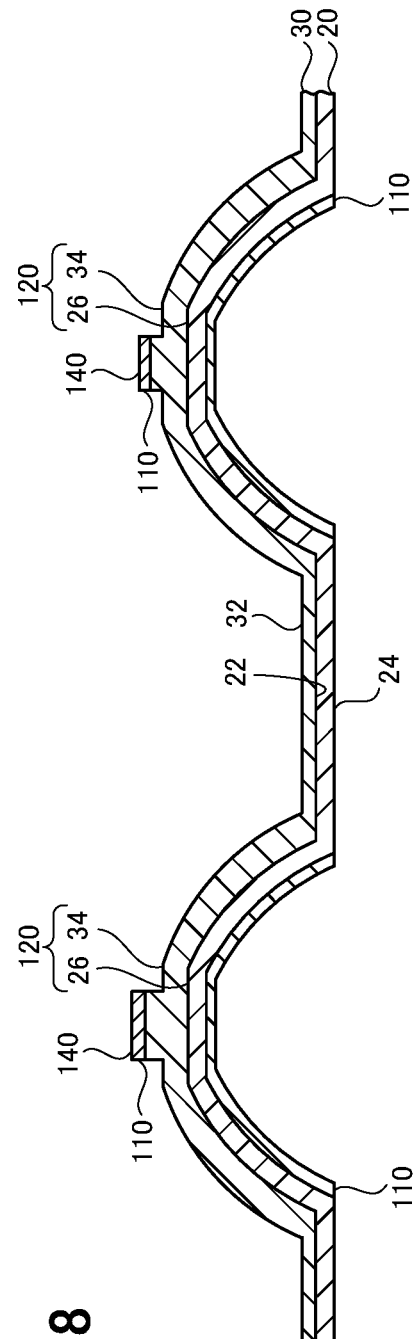
FIG. 18 is a schematic drawing illustrating a cross-section of a resin sheet according to Embodiment 4 of the present disclosure.

As illustrated in FIG. 18, the resin sheet 100 of the present embodiment includes the base 20, the thermally expansive layer 30, and heat conversion layers 110 formed on the main surface 24 of the base 20 and on the surface 32 of the thermally expansive layer 30. Furthermore, the resin sheet 100 includes, as shaped objects, the first protrusions 120 and fourth protrusions 140 formed on the first protrusions 120. As in Embodiment 1, the first protrusions 120 are formed by the base 20 being deformed due to the distending of the thermally expansive layer 30. The fourth protrusions 140 are formed by the distending of the thermally expansive layer 30, independent of the deformation of the base 20.

The configurations of the base 20, the thermally expansive layer 30, and the heat conversion layer 110 of the present embodiment are the same as the configurations of the base 20, the thermally expansive layer 30, and the heat conversion layer 110 of Embodiment 1. Additionally, the resin molding sheet 10 used in the production of the resin sheet 100 of the present embodiment is the same as the resin molding sheet 10 of Embodiment 1. A production method for the resin sheet 100 of the present embodiment will be described while referencing FIGS. 19 and 20. As in Embodiment 1, in the present embodiment, the surface 32 of the thermally expansive layer 30 is the first main surface 32 of the resin molding sheet 10. Additionally, the main surface 24 of the base 20 is the second main surface 24 of the resin molding sheet 10.

FIG. 19 is a flowchart illustrating a production method for the resin sheet 100 of the present embodiment. The production method for the resin sheet 100 of the present embodiment includes a preparation step (step S20), a heat conversion layer forming step (step S30), a pre-heating step (step S40), and a main heating step (step S50).

In the preparation step (step S20), the resin molding sheet 10 is prepared in the same manner as in preparation step (step S20) of Embodiment 1. Furthermore, ink that contains the heat conversion material is prepared.

In the heat conversion layer forming step (step S30), as illustrated in FIG. 20, heat conversion layers 110 of predetermined patterns are formed on each of the first main surface 32 and the second main surface 24 of the resin molding sheet 10. Specifically, the ink that contains the heat conversion material is printed, in a predetermined pattern, on the second main surface 24 of the resin molding sheet 10 by the printing device. Additionally, the ink that contains the heat conversion material is printed, in a predetermined pattern, on the first main surface 32 of the resin molding sheet 10. This predetermined pattern differs from the predetermined pattern printed on the second main surface 24 of the resin molding sheet 10.

In the present embodiment, the pattern of the heat conversion layer 110 formed on the second main surface 24 of the resin molding sheet 10 corresponds to the pattern of the first protrusions 120. The pattern of the heat conversion layer 110 formed on the first main surface 32 of the resin molding sheet 10 corresponds to the pattern of the fourth protrusions 140. Here, the ink that contains the heat conversion material printed on the first main surface 32 of the resin molding sheet 10 is printed lighter than the ink that includes the heat conversion material printed on the second main surface 24 of the resin molding sheet 10. As a result, the fourth protrusions 140 can be formed by the distending of the thermally expansive layer 30, independent of the deformation of the base 20.

In the pre-heating step (step S40) in FIG. 19, the resin molding sheet with heat conversion layer 10 is irradiated with electromagnetic waves and, as a result, the resin molding sheet with heat conversion layer 10 is heated to a temperature that is lower than the expansion starting temperature. With the exception of the thermally expansive layer 30 being formed on the first main surface 32 and the second main surface 24 of the resin molding sheet 10, the pre-heating step (step S40) of the present embodiment is the same as the pre-heating step (step S40) of Embodiment 1.

Finally, in the main heating step (step S50), the heat conversion layer 110, of the resin molding sheet with heat conversion layer 10 that is heated in the pre-heating step (step S40), is irradiated with electromagnetic waves in the same manner as in the main heating step (step S50) of Embodiment 1. As a result, the first protrusions 120 and the fourth protrusions 140 are formed. As in Embodiment 1, the first protrusions 120 are formed by the base 20 being deformed due to the distending of the thermally expansive layer 30. Since the ink of the heat conversion layer 110 that corresponds to the fourth protrusions 140 is printed lighter, the fourth protrusions 140 are formed by the distending of the thermally expansive layer 30, independent of the deformation of the base 20.

Thus, a resin sheet 100, which includes the first protrusions 120 and the fourth protrusions 140 as shaped objects, can be produced. In the present embodiment, the first protrusions 120 and the fourth protrusions 140 are formed by emitting electromagnetic waves, without using a die. As such, the resin sheet 100 can be easily produced. Additionally, the heat conversion layer 110 is formed on the first main surface 32 and the second main surface 24 of the resin molding sheet 10. As such, it is possible to easily form first protrusions 120 and fourth protrusions 140 that have different patterns. Furthermore, in the pre-heating step (step S40), the base 20 is softened and, as such, the height of the first protrusions 120 can be increased. Additionally, finer first protrusions 120 can be formed.

Embodiments of the present disclosure have been described, but various modifications can be made to the present disclosure without departing from the spirit and scope of the present disclosure.

For example, a configuration is possible in which the resin molding sheet 10 is produced in a roll shape. Moreover, a configuration is possible in which the resin sheet 100 is produced in a roll shape from a roll-shape resin molding sheet 10.

The material of the base 20 is not limited to thermoplastic resins. The material of the base 20 may be paper, fabric, or the like. The thermoplastic resin of the base 20 is not limited to polyolefin resins and polyester resins. The thermoplastic resin of the base 20 may be a polyamide resin, a polyvinyl chloride (PVC) resin, a polyimide resin, or the like.

The printing device used in the forming of the heat conversion layer 110 and the color ink layer 130 is not limited to ink jet printers. The printing device may be an offset printer, a screen printer, or the like. The lamp heater 322 of the expansion device 300 is not limited to a halogen lamp. Any radiation source that radiates electromagnetic waves that can be absorbed and converted to heat by the heat conversion layer 110 may be used as the lamp heater 322 of the expansion device 300. The electromagnetic waves are not limited to electromagnetic waves of the visible light spectrum and the infrared region. Any electromagnetic waves that can be absorbed and converted to heat by the heat conversion layer 110 may be used.

The irradiator 320 moves in the expansion device 300 used in the pre-heating step (step S40) and the main heating step (step S50) of Embodiments 1 to 4. A configuration is possible in which the irradiator 320 is not moved by the expansion device 300 but, rather, the expansion device 300 moves the tray 310 on which the resin molding sheet with heat conversion layer 10 is mounted to transport the resin molding sheet with heat conversion layer 10. In this case, the temperature to which the resin molding sheet with heat conversion layer 10 is heated can be adjusted by controlling the transportation speed of the resin molding sheet with heat conversion layer 10, the intensity of the electromagnetic waves, and the like, thereby controlling the amount of energy per unit area and per unit time of the electromagnetic waves emitted on the resin molding sheet with heat conversion layer 10. In one example, in the pre-heating step (step S40), as a first transportation, the resin molding sheet with heat conversion layer 10 is transported while being irradiated with electromagnetic waves from a fixed irradiator 320. As a result of this configuration, the resin molding sheet with heat conversion layer 10 is heated to a temperature that is lower than the expansion starting temperature. Additionally, in the main heating step (step S50), as a second transportation, the resin molding sheet with heat conversion layer 10, which is heated to a temperature that is lower than the expansion starting temperature, is transported while the heat conversion layer 110 of the resin molding sheet with heat conversion layer 10, which is heated to a temperature that is lower than the expansion starting temperature, is irradiated with electromagnetic waves from a fixed irradiator 320, thereby causing the thermally expansive layer 30 to distend. As a result of this configuration, the base 20 deforms and the first protrusions 120 are formed on the resin molding sheet with heat conversion layer 10. The pre-heating step (step S40) is also expressed as a first transportation step. The main heating step (step S50) is also expressed as a second transportation step.

A configuration is possible in which, when the resin sheet 100 is produced from a roll-shape resin molding sheet 10, the resin molding sheet 10 pulled from the roll is moved. Furthermore, a configuration is possible in which, in the pre-heating step (step S40) and the main heating step (step S50), the irradiator 320 and the resin molding sheet with heat conversion layer 10 are not moved.

In the pre-heating step (step S40) of Embodiments 1 to 4, the irradiator 320 of the expansion device 300 emits electromagnetic waves to heat the resin molding sheet with heat conversion layer 10 to a temperature that is lower than the expansion starting temperature. However, the means by which the resin molding sheet with heat conversion layer 10 is heated to a temperature that is lower than the expansion starting temperature is not limited to the irradiation of electromagnetic waves. For example, a configuration is possible in which the resin molding sheet with heat conversion layer 10 is heated to a temperature that is lower than the expansion starting temperature by an electric heater provided on the tray 310 of the expansion device 300.

In Embodiment 2, the color ink layer 130 is formed on the surface 32 of the thermally expansive layer 30. However, a configuration is possible in which the color ink layer 130 is formed on the heat conversion layer 110 and/or the second main surface 24 of the resin molding sheet 10 (the main surface 24 of the base 20). Moreover, a configuration is possible in which the color ink layer forming step (step S25) is performed after the main heating step (step S50).

Configurations are possible in which the color ink layer 130 is provided on the resin sheets 100 of Embodiments 3 and 4. For example, a configuration is possible in which the color ink layer 130 is formed on the second main surface 24 of the resin molding sheet 10 (the main surface 24 of the base 20) before the heat conversion layer forming step (step S30) of forming the heat conversion layer 110 on the first main surface 42 of the resin molding sheet 10 (the surface 42 of the release layer 40). Since the resin sheet 100 of Embodiment 3 does not include the heat conversion layer 110, a more vivid color image is formed on the resin sheet 100.

The release layer 40 of Embodiment 3 is not limited to resin films that have been subjected to a releasing treatment. For example, the release layer 40 may be implemented as a resin film that is affixed via an adhesive. Additionally, a configuration is possible in which the release layer 40 is provided on the second main surface 24 of the base 20. A configuration is possible in which, in the heat conversion layer forming step (step S30), the heat conversion layer 110 is formed on the release layer 40 that is provided on the second main surface 24. Furthermore, a configuration is possible in which the release layer 40 is provided on the thermally expansive layer 30 and also on the second main surface 24 of the base 20. Moreover, a configuration is possible in which, in the heat conversion layer forming step (step S30), the heat conversion layer 110 is formed on each of the release layers 40 that are provided on the thermally expansive layer 30 and on the second main surface 24.

In the resin sheet 100 of Embodiment 4, the fourth protrusions 140 are formed by the distending of the thermally expansive layer 30, independent of the deformation of the base 20. A configuration is possible in which, as with the first protrusions 120, the fourth protrusions 140 are formed by the deformation of the base 20. For example the fourth protrusions can be formed by printing the ink that contains the heat conversion material, which is printed on the first main surface 32 of the resin molding sheet 10, at the same density as the ink that includes the heat conversion material, which is printed on the second main surface 24 of the resin molding sheet 10.

The resin molding sheets 10 and the resin sheets 100 of Embodiments 1 to 4 may include other layers of desired materials between the layers described above. For example, a configuration is possible in which an adhesive layer, which causes the thermally expansive layer 30 to be more strongly adhered to the base 20, is formed between the base 20 and the thermally expansive layer 30. The adhesive layer is formed from a surface modifier, for example. Additionally, a configuration is possible in which a fixing layer that fixes the ink is formed between the color ink layer 130 and the thermally expansive layer 30.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A resin sheet production method, comprising:
   a preparation step of preparing a resin molding sheet including a base and a thermally expansive layer that is formed on one main surface of the base, the thermally expansive layer including a thermally expandable material;
   a heat conversion layer forming step of forming a heat conversion layer that converts electromagnetic waves to heat on at least one of a first main surface of the resin molding sheet or a second main surface on a side opposite to the first main surface;
   a pre-heating step of heating the resin molding sheet on which the heat conversion layer is formed to a temperature that is lower than an expansion starting temperature at which the thermally expandable material starts to expand, to soften the base so that a temperature of a region of the base where the heat conversion layer is provided is higher than a temperature of a region of the base where the heat conversion layer is not provided; and
   a main heating step of irradiating the heat conversion layer of the resin molding sheet with the electromagnetic waves while maintaining a state of the base softened by heating in the pre-heating step, to cause the thermally expansive layer to distend, thereby causing the base to deform with distention of the thermally expansive layer and forming a shaped object on the resin molding sheet.

2. The resin sheet production method according to claim 1, wherein in the pre-heating step, the resin molding sheet on which the heat conversion layer is formed is heated to a temperature that is equal to or higher than a temperature that is 25° C. lower than a Vicat softening temperature of a material forming the base.

3. The resin sheet production method according to claim 2, wherein in the pre-heating step, the resin molding sheet is heated by being irradiated with the electromagnetic waves.

4. The resin sheet production method according to claim 3, wherein in the main heating step, the base is caused to deform such that a height of a protrusion of the base resulting from deformation with the distention of the thermally expansive layer is greater than an amount of change in a thickness of the thermally expansive layer resulting from distention.

5. The resin sheet production method according to claim 4, further comprising:
   a color ink layer forming step of forming a color ink layer on the first main surface of the resin molding sheet, wherein
   in the heat conversion layer forming step, the heat conversion layer is formed on the second main surface of the resin molding sheet.

6. The resin sheet production method according to claim 5, wherein the color ink layer forming step is performed before the heat conversion layer forming step.

7. The resin sheet production method according to claim 2, wherein in the main heating step, the electromagnetic waves are emitted such that a height of a protrusion of the base formed as a result of deformation of the base is greater than an amount of change in a thickness of the thermally expansive layer with the distention of the thermally expansive layer.

8. The resin sheet production method according to claim 7, wherein the thickness of the thermally expansive layer is less than or equal to a thickness of the base.

9. The resin sheet production method according to claim 8, wherein in the preparation step, the thermally expansive layer is formed on one main surface of the base.

10. The resin sheet production method according to claim 7, wherein
    in the preparation step, a peelable release layer is provided on at least one of the thermally expansive layer or a second main surface of the base,
    in the heat conversion layer forming step, the heat conversion layer is formed on the peelable release layer, and
    the resin sheet production method further comprises a peeling step of peeling the peelable release layer from the resin molding sheet on which the shaped object is formed.

11. A resin sheet production method, comprising:
    a preparation step of preparing a resin molding sheet including a base and a thermally expansive layer that is formed on one main surface of the base, the thermally expansive layer including a thermally expandable material;
    a heat conversion layer forming step of forming a heat conversion layer that converts electromagnetic waves to heat on at least one of a first main surface or a second main surface on a side opposite to the first main surface;
    a first transportation step of heating, while transporting the resin molding sheet on which the heat conversion layer is formed, the resin molding sheet to a temperature that is lower than an expansion starting temperature at which the thermally expandable material starts to expand, to soften the base so that a temperature of a region of the base where the heat conversion layer is provided is higher than a temperature of a region of the base where the heat conversion layer is not provided; and
    a second transportation step of irradiating the heat conversion layer of the resin molding sheet with the electromagnetic waves while maintaining a state of the base softened by heating in the first transportation step and transporting the resin molding sheet, to cause the thermally expansive layer to distend, thereby causing the base to deform with distention of the thermally expansive layer and forming a shaped object on the resin molding sheet.

12. The resin sheet production method according to claim 11, wherein in the first transportation step, the base is heated to a temperature at which the base softens, the temperature being lower than the expansion starting temperature.

13. The resin sheet production method according to claim 12, wherein in the first transportation step, the resin molding sheet on which the heat conversion layer is formed is heated to a temperature that is equal to or higher than a temperature that is 25° C. lower than a Vicat softening temperature of a material forming the base.

14. The resin sheet production method according to claim 13, wherein in the second transportation step, the base is caused to deform such that a height of a protrusion of the base resulting from deformation is greater than an amount of change in a thickness of the thermally expansive layer resulting from distention.

15. The resin sheet production method according to claim 14, wherein the thickness of the thermally expansive layer is less than or equal to a thickness of the base.

16. The resin sheet production method according to claim 15, wherein in the preparation step, the thermally expansive layer is formed one main surface of the base.

17. The resin sheet production method according to claim 16, wherein
in the preparation step, a peelable release layer is provided on at least one of the thermally expansive layer or a second main surface of the base,
in the heat conversion layer forming step, the heat conversion layer is formed on the peelable release layer, and
the resin sheet production method further comprises a peeling step of peeling the peelable release layer from the resin molding sheet on which the shaped object is formed.

18. The resin sheet production method according to claim 11, further comprising:
a color ink layer forming step of forming a color ink layer on at least one of the first main surface or the second main surface of the resin molding sheet.

19. The resin sheet production method according to claim 1, wherein
in the main heating step, the base that is softened by heating in the pre-heating step is further softened by heat released from the heat conversion layer, and force having a direction from another main surface opposite to the one main surface toward the one main surface is applied to the base with the distension of the thermally expansive layer formed on the one main surface of the base, thereby deforming the base toward the thermally expansive layer side.

20. The resin sheet production method according to claim 11, wherein
in the second transportation step, the base that is softened by heating in the first transportation step is further softened by heat released from the heat conversion layer, and force having a direction from another main surface opposite to the one main surface toward the one main surface is applied to the base with the distension of the thermally expansive layer formed on the one main surface of the base, thereby deforming the base toward the thermally expansive layer side.

* * * * *